INVENTORS A. H. BOBECK
J. H. FELKER
BY [signature]
ATTORNEY

INVENTORS A. H. BOBECK
J. H. FELKER
BY James W. Falk
ATTORNEY

INVENTORS A. H. BOBECK
J. H. FELKER
BY
ATTORNEY

INVENTORS A. H. BOBECK
J. H. FELKER
BY
ATTORNEY

INVENTORS A. H. BOBECK
J. H. FELKER
BY
ATTORNEY 2,939,114

Patented May 31, 1960

2,939,114

MAGNETIC MEMORY SYSTEM

Andrew H. Bobeck, Chatham, and Jean H. Felker, Livingston, N.J., assignors to Bell Telephone Laboratories, Incorporated, New York, N.Y., a corporation of New York Filed Dec. 28, 1955, Ser. No. 555,889

18 Claims. (Cl. 340—174)

This invention relates to electrical information handling systems and more particularly to an improved magnetic core memory system.

Magnetic core memory systems are known in the art which comprise a plurality of cores of a magnetic material having a substantially rectangular hysteresis characteristic and therefore capable of saturation in either of two polarities. The direction of saturation of a core in systems of this type may be altered as required in accordance with the information to be stored and, as such, these cores find great utility in storing a bit of information in a two-valued or binary coded memory system.

In a typical system of this type, such as the coincident current memory described in an article by Jay W. Forrester, entitled "Digital Information Storage in Three Dimensions Using Magnetic Cores," Journal of Applied Physics for January, 1951, at pages 44 to 48, the cores are arranged in columns and rows to form a matrix. Each of the cores in a column has inductively coupled thereto at least one winding of a plurality of series connected column windings and each core in a row has inductively coupled thereto at least one winding of a plurality of series connected row windings. In addition each of the cores generally has coupled thereto a readout winding which detects a change in the magnetic condition of the core.

In the operation of many of these coincident current memory systems digital information is written into and read out of the matrix on an single core or bit basis. That is, current is applied to the row winding and the column winding which are coupled to the core whose saturation polarity it is desired to change. The amplitude of the current applied to each of the selected column and row windings is on the order of one-half of that required to cause the selected core to change from one saturation polarity to the other. Accordingly, the selected core receives a total amount of current sufficient to change its magnetic condition, if the core is not already in the condition to which it is being driven, while the cores which are coupled either to an energized row winding alone, or an energized column winding alone receive only half the required excitation and therefore do not change their remanent condition.

Reading of the magnetic condition of a core in the matrix in a coincident current system is accomplished by selectively energizing the rows and column winding coupled to the core. If the core has the same polarity as that to which the driving current tends to drive it, substantially no voltage pulse will be induced in the readout winding. If the polarity of the core is changed by the driving current a voltage pulse will be induced in the readout winding.

Manifestly, the above-described type of coincident current magnetic core memory system possesses serious limitations in many applications of such systems. For example, if a large number of binary digits forming a word is to be stored in the memory, the bit-by-bit method can be extremely time consuming or alternately require complex associated circuitry. In view of this it is advantageous to provide a word organized memory system wherein all the digits of an entire word may simultaneously be written in or read out of the magnetic core matrix. However, it will be appreciated that a number of constant current driving sources for the cores of the matrix will be necessitated due to the large variation of possible impedance values which may be presented to the access circuitry of the memory system.

It further will be appreciated that in prior systems of the type discussed above the process of reading information out of the memory resets the cores and destroys the stored information. Therefore, some means is required which will restore the information, or, alternately, substitute new information in the cores when desired. Additional means also may be required for amplifying the information read out of the memory and passing it along to a utilization device for disposition.

It is a general object of this invention to provide an improved memory system. More specifically, it is an object of this invention to provide an improved word organized magnetic core memory system.

It is a further object of this invention to provide a word organized magnetic core memory having a sequential access switch capable of supplying a constant current drive to a magnetic core matrix having a wide range of input impedance values.

It is a still further object of this invention to provide a word organized magnetic core memory system having magnetic core programming means wherein master or subroutine commands for a magnetic core matrix may be made in accordance with the magnetic logic of the programming means.

It is another object of this invention to provide a word organized magnetic memory system having improved input-output circuit means for selectively restoring a row of magnetic cores to an information condition after a readout operation and for inhibiting the resetting of the information read out and substituting therefor new information in the magnetic cores.

It is still another object of this invention to provide a word organized magnetic core memory system which achieves speed and compactness by having associated operating circuitry utilizing low current devices of the type known as transistors.

These and other objects are realized in an illustrative embodiment of this invention which comprises a magnetic core matrix including a plurality of cores of a magnetic material having a substantially rectangular hysteresis characteristic arranged in rows and columns. As each core can be made to reside in a static residual magnetic state in one flux direction or the other, designated as P and N, each state may be representative of a binary one or zero, respectively. A generator supplies two-phase pulses through a sequential access switch and programmer to the matrix, a pulse of the first phase $\Phi_1$ being applied to the cores during the read cycle and a pulse of the second phase $\Phi_2$ being applied to the cores during the write cycle. Each of the cores in a row of the matrix has inductively coupled thereto a read winding to which the $\Phi_1$ pulses are applied. In a similar manner, each of the cores in a row and each of the cores in a column has inductively coupled thereto a write winding to which the $\Phi_2$ pulses are applied. Additionally, a readout winding is inductively coupled to each of the cores in a row.

In the illustrative embodiment described herein, reading of the cores of the matrix is not coincident, but writing into the cores requires a coincidence of current pulses.

That is, during the read interval $\Phi_1$ an N-drive current pulse applied to a row of cores will read the entire row by causing the cores residing in the N flux state to switch to the P flux state. Consequently, a voltage pulse will be induced in the readout winding of each core in the selected row which is switched from N to P and this information is transmitted in parallel form down the columns of the matrix to a number of input-output circuits. During the write interval $\Phi_2$ a half amplitude current pulse $P/2$ is applied to each core in a selected row and another half amplitude current pulse $P/2$ is applied to the cores of selected columns of the matrix. Only the cores at the intersections of energized rows and column windings have a binary one written therein. All of the other cores in the row and columns selected receive only half amplitude current pulses and therefore their magnetic states are unaffected.

Thus, current pulses are required for the rows of a magnetic core matrix during both the reading and writing operations, while a current pulse is required for the columns of the matrix only during the writing operation. In accordance with an aspect of this invention the row current pulses are supplied by a magnetic core sequential access switch which provides constant current outputs under the control of repetitive advance pulses As discussed above, such constant current outputs are necessary to drive a word organized memory inasmuch as the impedance of the core matrix can vary over a very wide range in accordance with the information stored therein. Stated another way, a memory system of the type shown in the instant illustrative embodiment is able to operate properly because of the constant current pulses supplied by the magnetic core sequential access switch for driving the coincident current matrix in spite of the impedance variations within the matrix. In accordance with another aspect of this invention programming of the magnetic core matrix is obtained by inserting a patchboard between the magnetic core sequential access switch and the magnetic core matrix. The patchboard may be wired to provide any desired master or subroutine program operation.

The magnetic core sequential access switch is driven by a magnetic core pulse generator which advantageously may be under the control of either a free running blocking oscillator or signals supplied by an order generator. In accordance with another aspect of this invention, five possible outputs are provided by the pulse generator, namely, a pair of output pulses for driving a master access switch, a pair of output pulses for driving a subroutine access switch, and an output which occurs in coincidence with the write pulse of either of the above pair of output pulses. The pulse generator comprises a magnetic core logic circuit including a pair of magnetic flip-flops. Each flip-flop consists of two blocking oscillators connected back to back to form two pairs of AND circuits wherein the AND circuit which produces an output pulse depends on whether the magnetic flip-flops are operated in or out of synchronism. The pulse generator advantageously is as disclosed in application Serial No. 555,976, filed December 28, 1955, of A. H. Bobeck.

The functions of the input-output circuits is to temporarily store the information read out of the matrix and to supply $P/2$ current pulses to the columns of the matrix in accordance with the readout or other information during the writing interval. The logic of the magnetic core input-output circuits permits new information to be inserted by inhibiting the usual input-output loop and inserting such new information in the input path to the matrix. During the write cycle the input-output circuits are sensed by a pulse originating in the pulse generator. Coincident current pulses then are applied to the columns of the matrix in accordance with the information previously stored.

The driving currents for the magnetic circuits of the memory system shown in the instant illustrative embodiment are supplied by a plurality of transistor circuits connected in the pulse generator and the input-output circuits. The use of such transistors to drive the cores enables the magnetic core memory to operate with a relatively small amount of power and to be constructed in a rugged and compact manner.

It is a feature of this invention to drive a word organized magnetic core matrix by a magnetic core access switch having a constant current output.

It is a further feature of this invention that a patchboard be connected between a pair of constant current access switches and the matrix for permitting selective reading and writing operations of the cores of the matrix.

It is a still further feature of this invention that the pair of access switches be connected so as to provide master and subroutine programs, respectively.

It is a still further feature of this invention that the patchboard include a reverse switch for providing either master or subroutine commands as desired to the memory matrix.

It is another feature of this invention that the logical AND function of a magnetic core input-output circuit be utilized to restore a row of cores in a matrix array to its previous information condition after a readout operation.

It is still another feature of this invention that the logical INHIBIT function of the magnetic core input-output circuit be utilized to erase the information stored in the cores of the array and to substitute new information therein if desired.

It is still another feature of this invention that transistors be utilized to provide the drive requirements of the magnetic circuits of the word organized magnetic core memory so as to reduce size and power requirements as well as to provide increased ruggedness to the system.

A complete understanding of this invention and the features thereof may be gained from the following description and accompanying drawing, in which.

Figure 1:
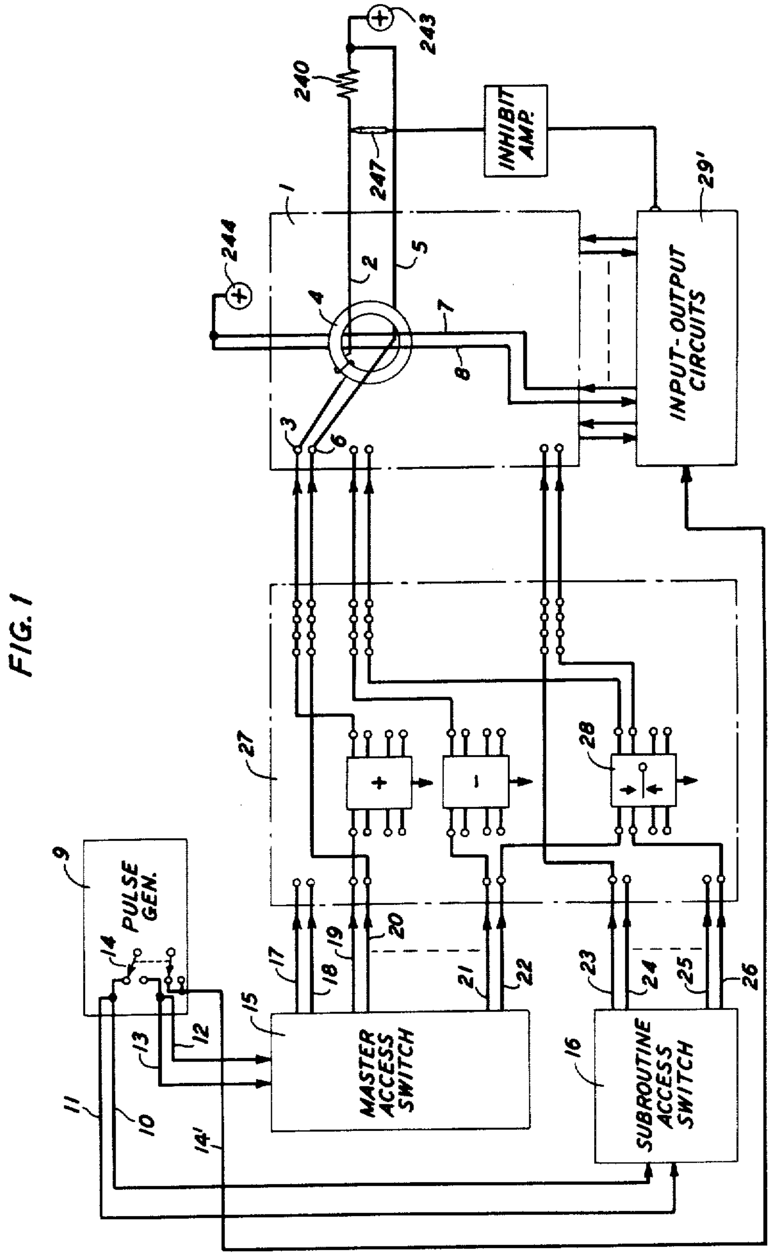
Fig. 1 is a block diagram representation of a word organized magnetic core memory system illustrative of one specific embodiment of this invention.

Referring now to the drawing, the magnetic memory system depicted in block diagram form in Fig. 1 comprises a magnetic core matrix 1 which in the instant illustrative embodiment includes a rectangular array of word organized magnetic core memory units and a magnetic core constant word generator. Each core of the array, of which core 4 is a typical example, advantageously has a read winding 2, which winding is connected through the other cores in the same row of the matrix between a row input terminal 3 and a resistance 240. In addition, each core in the row has threaded therethrough a write winding 5 connected through the other cores of the row between an input terminal 6 and a voltage reference such as source 243 while each core in a column has threaded therethrough a write winding 7 connected through the other cores of the column between an associated input-output circuit 29' and a voltage reference, such as source 244. In accordance with the invention full amplitude current pulses are applied to the read winding 2 during the read interval $\Phi_1$ and half amplitude current pulses are applied to write windings 5 and 7 of the selected row and column during the write interval $\Phi_2$. Each core in a column additionally has threaded therethrough a readout winding 8 connected through the other cores of the column between its input-output circuit 29' and ground.

The $\Phi_1$ and $\Phi_2$ pulses are supplied by a pulse generator 9 which advantageously may be under the control of a free running oscillator or an order generator. Pulse generator 9 provides a series of alternately spaced $\Phi_1$ and $\Phi_2$ pulses on either of the output conductor pairs 10 and 11 or 12 and 13, respectively, in accordance with the operation of a magnetic core logic switching means, depicted symbolically in Fig. 1 as switch 14. Thus in one position of switch 14, the alternately spaced $\Phi_1$, $\Phi_2$ pulses are applied via conductors 12 and 13 to a master sequential access switch 15 and in the other position of switch 14 these pulses are applied via conductors 10 and 11 to a sub-routine sequential access switch 16.

Each access switch in response to the $\Phi_1$, $\Phi_2$ pulses supply a plurality of constant current pulses in sequential order over a group of output conductor pairs, such as pairs 17 and 18, 19 and 20, and 21 and 22 of master switch 15 and pairs 23 and 24, and 25 and 26 of subroutine switch 16. In accordance with an aspect of this invention, these constant current outputs are programmed by a patchboard 27 connected between the access switch output pairs and the input terminals of the magnetic core matrix 1. Advantageously, patchboard 27 has wired therein a reverse switch command circuit 28 for controlling switch 14 in the pulse generator so that the operation of reverse switch command circuit 28 determines the operation of either the master or subroutine access switches. Patchboard 27 may be patched to enable the programmer to utilize a subroutine any number of times during a master program cycle.

In accordance with an aspect of the invention the magnetic core matrix 1 may comprise a magnetic core constant word generator for supplying constants to the system when required. The constant generator provides a plurality of binary words which can be altered mechanically in accordance with the information desired to be stored therein.

An important function of the input-output circuits 29' is to receive information over the readout windings 8 as it is read from the magnetic cores of memory array 1 during the read cycle $\Phi_1$, and to store such information for temporary intervals of time. Means are provided to make this information available to external utilization devices when and if desired. During the write cycle $\Phi_2$, the input-output circuits are sensed by a pulse signal originating in the pulse generator 9 via conductor 14'. If information previously has been read out of the matrix and is stored in the input-output circuits, coincident current pulses then are applied to the write windings 5 and 7 of the cores of the selected row and columns in accordance with the stored information if non-destructive reading is desired. Alternatively, new information may be written into the memory array 1 by the operation of external switching means.

Figure 2A:
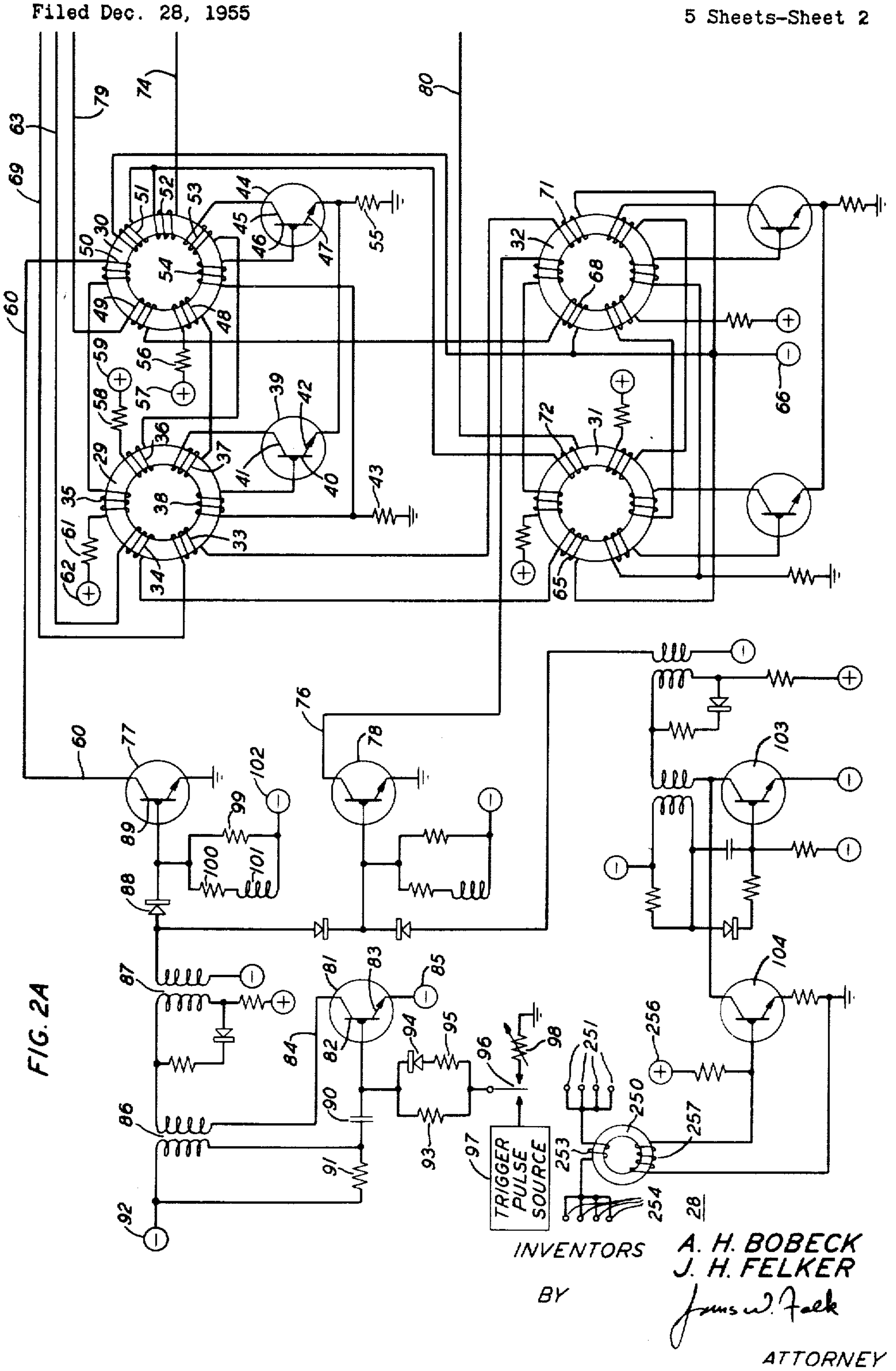
Figs. 2A and 2B are a detailed schematic representation of a pulse generator adapted to be utilized in the memory system of Fig. 1.
Figure 2B:
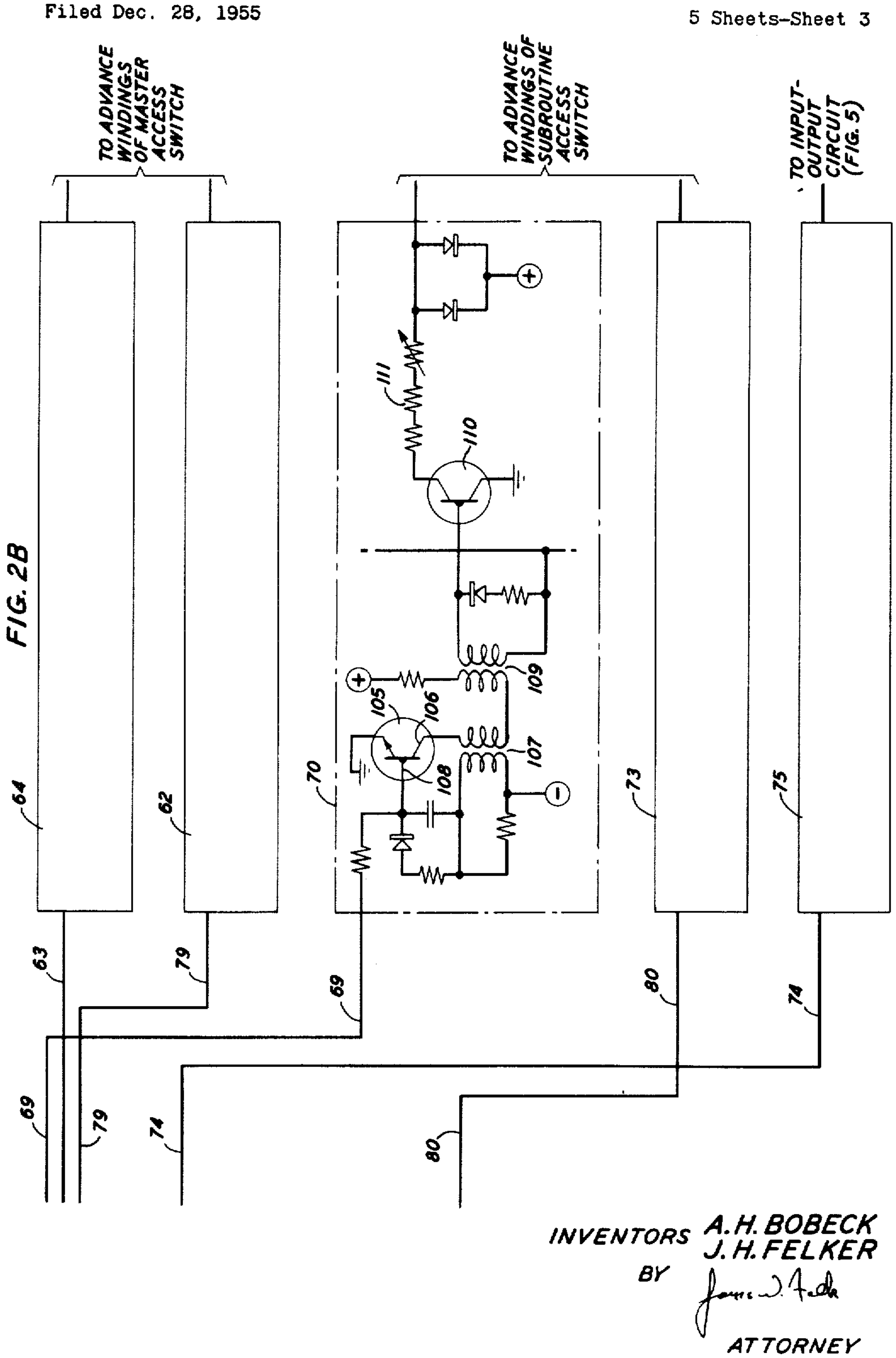

Figs. 2A and 2B of the drawing show the details of an illustrative embodiment of pulse generator 9 which may be utilized with the invention and which may be of the type further described in application Serial No. 555,976, filed December 28, 1955, of A. H. Bobeck. The heart of the pulse generator is a pair of magnetic core flip-flop circuits, each comprising two blocking oscillators connected back to back. One flip-flop includes magnetic cores 29 and 30 and the other includes magnetic cores 31 and 32. Each core in the flip-flops has a plurality of windings thereon, such as the windings 33, 34, 35, 36, 37 and 38 of core 29 and windings 48 through 54 of core 30. Each core also has a transistor associated therewith as, for example, transistor 39 which includes a base electrode 40, a collector electrode 41 and an emitter electrode 42. Base electrode 40 of transistor 39 is connected to one end of winding 38. Similarly, base electrode 46 of transistor 44 associated with magnetic core 30 is connected to one end of winding 54. The other ends of windings 38 and 54, respectively, are connected to a common junction and therefrom through resistance 43 to ground. Emitter electrodes 42 and 47 of transistors 39 and 44, respectively, are connected to a common junction and therefrom through a resistance 55 to ground. Collector electrode 41 of transistor 39 is connected to one end of winding 37 of magnetic core 29. The other end of winding 37 is connected through winding 48 of core 30 and resistance 56 to a source of direct current potential 57. Collector electrode 45 of transistor 44 is connected to one end of winding 53 of core 30. The other end of winding 53 is connected through winding 36 of magnetic core 29 and resistance 58 to a source of direct current potential 59.

Signal pulses are applied over conductor 60 to series-connected winding 50 of core 30 and winding 35 of core 29 and through a resistance 61 to a source of direct current potential 62. One end of winding 34 of core 29 is connected by conductor 63 to the pulse output circuit 64 and the other end of winding 34 is connected through an output winding 65 of magnetic core 31 to a source of direct current potential 66. Similarly, one end of winding 49 of magnetic core 30 is connected by conductor 79 to the pulse output circuit 62 while the other end thereof is connected through an output winding 68 of magnetic core 32 to the source of direct current potential 66. One end of winding 33 of magnetic core 29 is connected by conductor 69 to pulse output circuit 70 and the other end of winding 33 is connected through winding 71 of core 32 to direct current potential source 66. One end of winding 51 of magnetic core 30 is connected to direct current potential source 66, while the other end thereof is connected through winding 72 of magnetic core 31 and conductor 80 to pulse output circuit 73. Magnetic core 30 also includes a winding 52 which has one end thereof connected through winding 72 to output circuit 73 and the other end thereof connected by conductor 74 to pulse output circuit 75.

Thus it can be seen that the two pairs of magnetic core flip-flop circuits are basically similar in construction and are connected to comprise four logical AND circuits. One AND circuit comprises winding 65 of core 31 and winding 34 of core 29. A second AND circuit comprises winding 71 of core 32 and winding 33 of core 29. A third AND circuit comprises winding 68 of core 32 and winding 49 of core 30. The fourth AND circuit comprises winding 72 of core 31, and winding 51 of core 30. Thus core 31 has a separate winding connected in series with a winding of each of cores 29 and 30 and in a similar manner core 32 has a separate winding connected in series with a winding of each of cores 29 and 30, thereby providing four series combinations of core windings. In the operation of the flip-flop circuits their magnetic states are determined by driving pulses which are applied to the flip-flops over conductors 60 and 76 from transistor drivers 77 and 78, respectively. These four AND circuits provide alternate $\Phi_1$ and $\Phi_2$ pulses over conductors 63 and 79, respectively, or conductors 69 and 80, respectively, in accordance with the synchronous states of flip-flops, i.e., whether the flip-flops are operating in synchronism or out of synchronism. Each magnetic core of a flip-flop includes a blocking oscillator as, for example, magnetic core 29 wherein windings 37 and 38 are so connected and wound on core 29 that they regeneratively couple the base and collector electrodes of transistor 39. Likewise, windings 53 and 54 of magnetic core 30 are so connected and wound that they regeneratively couple the base and collector electrodes of transistor 44. Initially, one core of each flip-flop will be in the P magnetic state. A short duration trigger pulse from transistor 77 applied over conductor 60 tends to drive both cores in the flip-flop toward the N magnetic state. However, only the core initially in the P state causes regeneration in its associated blocking oscillator. The resulting collector current then tends to drive the second core from N to P. The next trigger pulse results in the second core being driven from P to N, which, in turn, drives the first core from N to P. Each time the cores change their magnetic state an output pulse appears over one of the conductors 63 and 79. Thus the continuous alternating synchronous condition of the pair of flip-flops produces alternate $\Phi_1$, $\Phi_2$ pulses on the output conductors which are applied to the pulse output circuits 64 and 62. Further, the pair of flip-flops are made to operate in a nonsynchronous manner in which case, alternate $\Phi_1'$, $\Phi_2'$ pulses are produced on the output conductors 69 and 80 which are applied to pulse output circuits 70 and 73.

The magnetic logic of the additional windings on the flip-flop cores, i.e., the windings connecting a core of one flip-flop with a core of the other flip-flop, is such that the pulses applied to one pair of output conductors will be inhibited if the flip-flops are being driven in synchronism and the pulses applied to the other pair of output conductors will be inhibited if the flip-flops are being driven out of synchronism. The synchronous state of operation of the cores is, in turn, determined by the reverse switch command circuit 28 located in patchboard 27 which results in the flip-flop comprising cores 31 and 32 getting an extra trigger pulse as will be explained in greater detail below.

The driving circuits for the flip-flop comprising magnetic cores 29 and 30 includes an amplifier driven by a transistor blocking oscillator which may be in a free running state or controlled by an external trigger pulse source as desired. The blocking oscillator comprises transistor 81 which includes base electrode 82, emitter electrode 83 and collector electrode 84. Emitter electrode 83 is connected to a source of negative direct current potential 85. Collector electrode 84 is connected through the secondary windings of transformer 86, transformer 87 and the diode 88 to the base electrode 89 of a transistor amplifier 77. Transformer 86 couples collector 84 to base 82 to provide the necessary regeneration for the oscillator. Base electrode 82 of transistor 81 is connected through a capacitance 90 and a parallel circuit comprising resistance 91 and the primary windings of transformer 86 to a source of negative potential 92. Base electrode 82 also is connected to a resistance 93 connected in parallel with the series combination of diode 94 and resistance 95 to the armature of switch 96. In one position of switch 96 the blocking oscillator is connected to a source of external trigger pulses 97 while in the other position of switch 96 the blocking oscillator is connected through a variable resistance 98 to ground. When the blocking oscillator is connected in the latter position, it is in a free running state, the rate of which is determined by the magnitude of resistance 98.

The amplifier comprising the transistor 77 includes the circuit comprising resistance 99 connected in parallel with the series combination of resistance 100 and inductance 101 which circuit is connected to a source of negative potential 102. Thus the output of a transistor blocking oscillator, whether it is being triggered by the external trigger source 97 or in its free running state, is amplified by transistor 77 and applied over conductor 60 to drive one of the magnetic core flip-flop circuits.

The driving pulses from the transistor blocking oscillator also are applied through an amplifier comprising transistor 78 over conductor 76 to the other magnetic core flip-flop. An additional pulse may be applied to the second magnetic core flip-flop for changing its synchronous condition from a circuit comprising transistor amplifier 104 and transistor blocking oscillator 103. These transistors are driven by the reverse switch command circuit 28 in the patchboard. The reverse switch command circuit 28 may advantageously comprise a biased square loop magnetic core 250, which core may be identical to that used in the memory array itself. Since the core is biased to one magnetic state, which may be N in this specific embodiment, a P pulse will result in the core switching from N to P. This P pulse may be supplied during phase 2 from any of a number of terminals 251 in the patchboard itself, the terminals being associated with any of the master or subroutines. Specifically, these terminals 251 are connected to the outputs of the access switch. In Fig. 2A four such terminals 251 are shown, the terminals being connected to an input or write winding 253. By proper choice of the number of turns of winding 253, the single pulse applied thereto is sufficient to switch the core. The winding 253 is also connected to a plurality of output terminals 254 which are connected through the patchboard to the desired address in the memory array. The core is switched back to N by the direct current bias applied from source 256 when the pulse is removed. Because of the winding polarities selected, only the switch from P to N causes an output from output winding 257, which in this specific embodiment may have fifty turns, to enable the transistor amplifier 104. In this embodiment wherein four input and output terminals 251 and 254 were employed, it was possible to switch to the subroutine a maximum of three times during one cycle of master routine.

The pulse output circuits 64, 62, 70 and 73 of pulse generator 9 are similar, each comprising a blocking oscillator including a transistor 105 having its collector electrode 106 coupled by a transformer 107 to its base electrode 108. The output of this blocking oscillator is applied by transformer 109 to a transistor amplifier comprising transistor 110 through resistance 111 to the advance windings of the sequential access switch. The other transistor output circuits substantially are identical to the one just described and apply the outputs of the magnetic core flip-flops to the advance windings of the master and subroutine sequential access switches. The write $\Phi_2$ pulses of each of the flip-flops are applied over conductor 74 to output circuit 75 which comprises a transistor blocking oscillator and transistor amplifier similar to that of pulse output circuit 70. The pulses appearing at the output of circuit 75 are distributed to the input-output circuit 29 of the memory system to be utilized in a manner explained in detail below with reference to Fig. 5 of the drawing.

Figure 3:
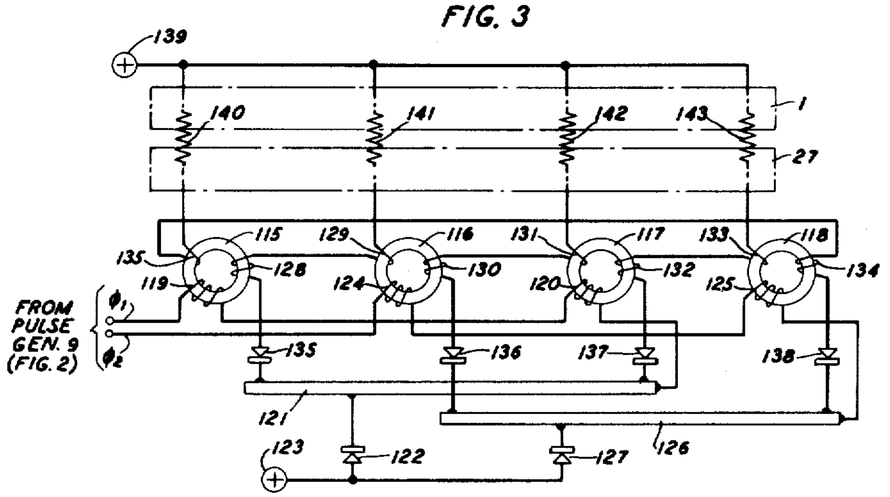
Fig. 3 is a schematic representation of a magnetic core sequential access switch of the type utilized in the memory system of Fig. 1.

Fig. 3 is a schematic diagram of an embodiment of a sequential access switch of the type which, in accordance with the invention, advantageously may be utilized in access switch 15 and subroutine access switch 16. This switch is a magnetic core switching circuit of the type described in M. Karnaugh Patent 2,719,961, granted October 4, 1955. Briefly, such a circuit comprises a plurality of magnetic cores, such as cores 115, 116, 117 and 118. Alternate cores 115 and 117 have their advance windings 119 and 120, respectively, connected in series in a circuit which has one end thereof connected to a source of $\Phi_1$ pulses from the output circuits of pulse generator 9 and the other end thereof to a $\Phi_1$ bar 121. Bar 121 is connected through diode 122 to a source of direct current potential 123.

Alternate cores 116 and 118 have their advance windings 124 and 125, respectively, connected in series in a circuit which has one end thereof connected to a source of $\Phi_2$ pulses from the output circuits of pulse generator 9 and the other end thereof connected to a $\Phi_2$ bar 126.

Bar 126 is connected through diode 127 to direct current potential source 123.

The output winding of each core is connected to the input winding of the succeeding core in a circuit between one of the Φ bars and the magnetic core array. For example, output winding 128 of core 115 has one end connected through diode 135 to $\Phi_1$ bar 121 and the other end to input winding 129 of core 116. The other end of input winding 129 is connected through patchboard 27 and magnetic core memory array 1, shown symbolically as load resistance 141 to a direct current potential source 139. Similarly, output winding 130 of core 116 has one end connected to $\Phi_2$ bar 126 through diode 136 and the other end through input winding 131 of core 117, patchboard 27 and memory array 1, shown symbolically as load resistance 142, to direct current potential source 139. Output winding 132 of core 117 has one end connected to $\Phi_1$ bar 121 through diode 137 and the other end through winding 133 of core 118, patchboard 27 and memory array 1, shown symbolically as load resistance 143, to direct current potential source 139. Output winding 134 of core 118 has one end connected to $\Phi_2$ bar 126 through diode 138 and the other end through input winding 135 of core 115, patchboard 27 and memory array 1, shown symbolically as load resistance 140, to direct current potential source 139.

The operation of the sequential access switch of Fig. 3 may be described by assuming that the advance $\Phi_1$ and $\Phi_2$ pulses are N drives and that only core 115 is at P and all other cores are at N. A $\Phi_1$ pulse from pulse generator 9 applied to input winding 119 of core 115 will switch core 115 to N during which the advance current will be directed to the output represented by the load resistance 141. To facilitate the explanation as to why the advance current selects the output represented by load resistance 141 and not the remaining parallel paths, consider the $\Phi_1$ bar 121. During the time the $\Phi_1$ bar is above the potential of source 139, diode 137 is in its open or nonconducting state. This does not apply to diode 135 since there is an active winding, namely, the output winding 128 of core 115 in that loop. In accordance with the invention the circuit is designed so that the induced voltage across output winding 128 more than compensates for the voltage drops across diode 135, input winding 129 of core 116 and the load. As previously explained, load resistance 141 represents the variable load presented by a magnetic core array 1 and the patchboard 27. Thus the action of core 115 in switching from P to N results in the $\Phi_1$ bar rising above the potential of direct current source 139 which opens diode 137 but not diode 135. At the same time, core 116 is driven from N to P due to the current through winding 129. Pulsing the $\Phi_2$ advance conductor results in the above-described operation repeating, during which time the $\Phi_2$ bar 126 rises above the potential of direct current source 139 and the output appears across load 142. Thus in response to the attenuating $\Phi_1$ and $\Phi_2$ advance pulses, sequential outputs are provided on the load resistances 140, 141, 142 and 143.

Many advantages are obtained in accordance with the invention by the use of the sequential access switch of Fig. 3 in the magnetic memory system disclosed herein. The output current from the switch to the load can be controlled precisely since it is equal to the advance current. Also the output current is independent of the load so long as the latter remains below a certain resistance, if the advance current source is a constant device.

Figure 4:
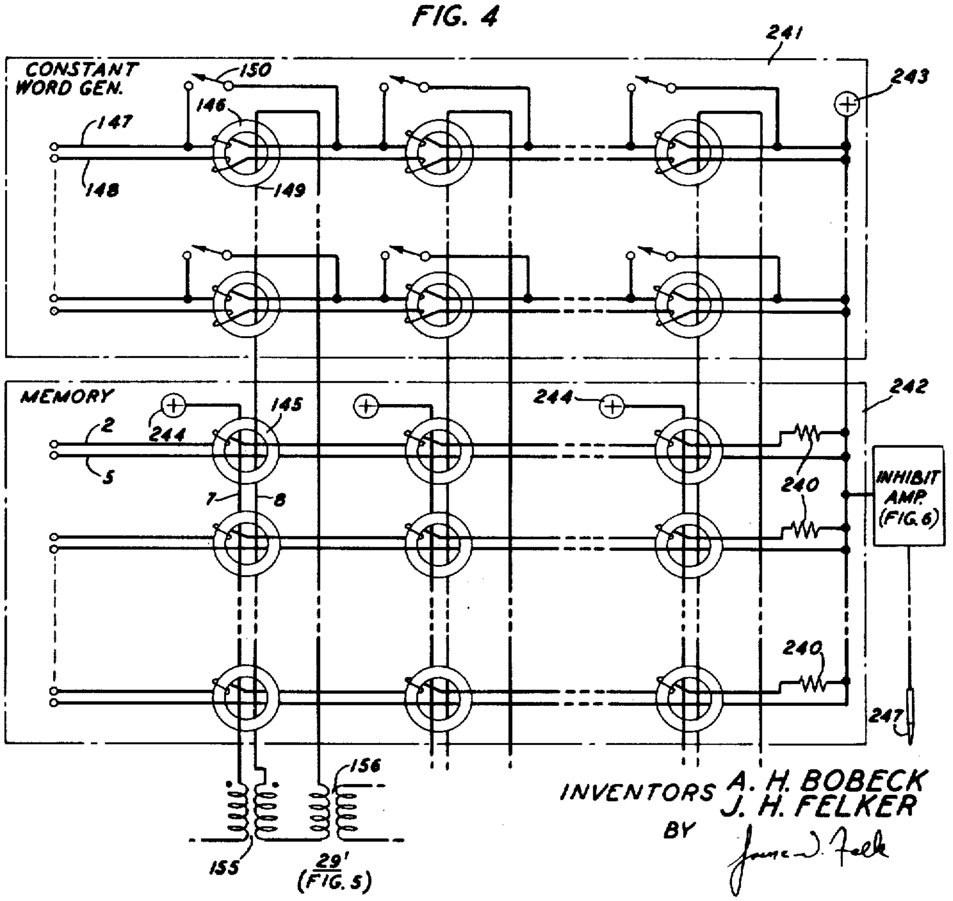
Fig. 4 is a schematic representation of a magnetic core matrix comprising a constant generator which advantageously may be utilized in the memory system of Fig. 1.

Magnetic memory array 1 including a constant word generator is shown in partial form in Fig. 4. This figure shows a plurality of magnetic cores arranged in a rectangular array. The cores of the coincident current memory array 242, such as cores 145, each have a $\Phi_1$ read winding 2 connected therethrough in the horizontal direction, a $\Phi_2$ write winding 5 connected therethrough in the horizontal direction, a write winding 7 connected therethrough in a vertical direction and a readout winding 8 also connected therethrough in the vertical direction. As explained heretofore, full amplitude ampere turn pulses are applied to read winding 2 during the read interval to an entire row of cores for reading a word out of the array at that time. As each word is read out of a row of cores the information is transmitted down the vertical windings 8 to the associated input-output circuits 29′ of the system. Half amplitude current pulses are applied to the write windings 5 and 7 of a selected row and selected columns of the array during the write interval $\Phi_2$ whereby information is written into the cores of a row by the coincident current method.

A constant word generator 241 is provided with the memory array in accordance with a further aspect of this invention for the purpose of generating a plurality of binary words which advantageously can be altered mechanically. The constant generator comprises a plurality of magnetic cores arranged in a rectangular matrix such as cores 146. Each core 146 has a $\Phi_1$ winding 147 threaded therethrough in series with the other cores of its row, a $\Phi_2$ winding 148 threaded therethrough in series with the other cores of its row, and a readout winding 149 threaded therethrough in series with the other cores of its column. In addition, each $\Phi_1$ winding 147 has bridged thereacross a switch 150 which advantageously may be a microswitch toggle or a pin and jack arrangement. Cores 146 of the constant generator serve merely as voltage generators. If a zero is desired to be read from a particular core its switch 150 is closed, thereby shortcircuiting its $\Phi_1$ winding 147. If a one is desired to be read from a particular core 146, its switch 150 is left open and the cores operate in the normal manner. The sequential access switches 15 and 16, Fig. 1, perform both reading and writing of the nonshortcircuited cores.

Figure 5:
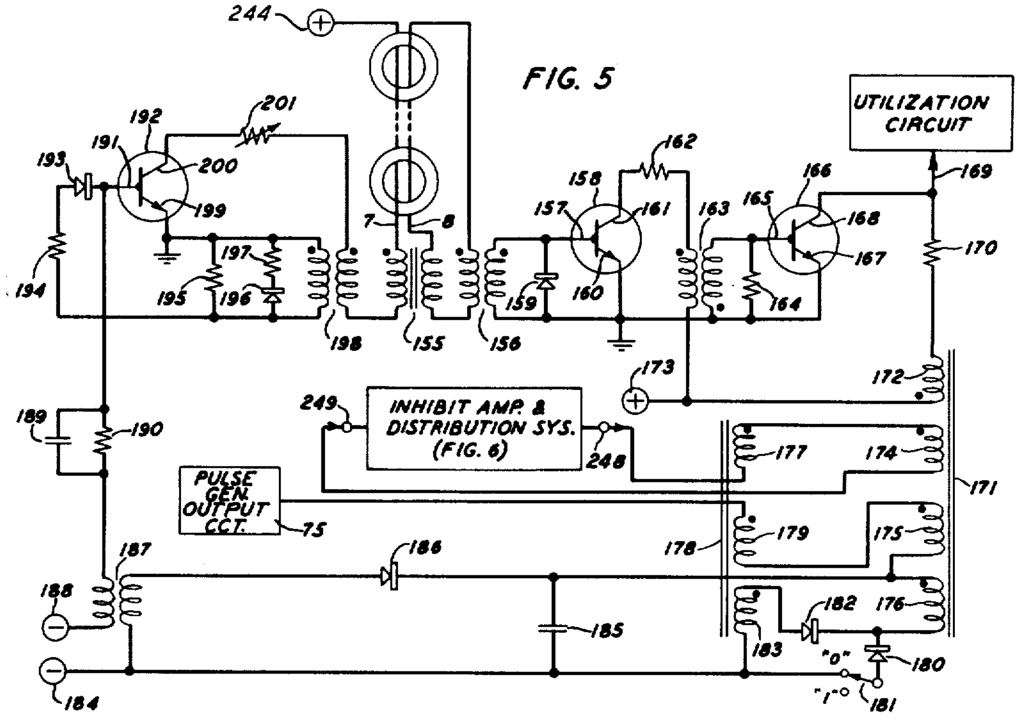
Fig. 5 is a schematic representation of an input-output circuit including a magnetic core logic circuit that may be employed in the embodiment of Fig. 1.

The input-output circuit schematically depicted in Fig. 5 basically functions to receive information as it is read from the memory array 1, store the information, and rewrite the information into the memory array 1, or if desired, inhibit the stored information to permit new information to be written into the memory array. Advantageously, there is an input-output circuit for each column of cores of the memory array 1. Each input-output circuit comprises a readout loop consisting of the magnetic cores of a column, a readout winding 8 threading each of these magnetic cores, a winding of transformer 155 and the primary winding of transformer 156. Transformer 155 advantageously has a core of the same material as the memory cores as discussed further below. The secondary winding of transformer 156 is connected to the base electrode 157 of transistor 158 and to diode 159, the other end of which is connected to ground. Emitter electrode 160 of transistor 158 is connected to ground and collector electrode 161 is connected through resistance 162 to the primary winding of transformer 163. The secondary winding of transformer 163 is connected to a resistance 164 and to the base electrode 165 of transistor 166. Emitter electrode 167 of transistor 166 is connected to ground and collector electrode 168 is connected via conductor 169 to such external circuits as may require the information read out of the memory array 1.

Collector electrode 168 also is connected through a resistance 170 and winding 172 of magnetic core 171 to a source of direct current potential 173. In addition to winding 172, magnetic core 171 also comprises windings 174, 175 and 176. Winding 174 has one end thereof connected to terminal 249 of the inhibit amplifier and distribution system, shown in Fig. 6 and described in detail below, and the other end thereof to winding 177 of magnetic core 178. Winding 175 of magnetic core 171 has one end thereof connected to winding 179 of magnetic core 178 and the other end thereof to winding 176 of the core 171. The other end of winding 176 is connected through diode 180 to the armature of switch 181 and through diode 182 to winding 183 of magnetic core 178.

The other end of winding 177 of core 178 is connected to terminal 248 of the inhibit amplifier and distribution system and the other end of winding 179 is connected to the $\Phi_2$ pulse source 75 of pulse generator 9.

One contact of switch 181, together with the other end of winding 183 of magnetic core 178, is connected to a source of direct current potential 184. The common connection of windings 175 and 176 is connected through a capacitance 185 and the series combination of diode 186 and the primary windings of transformer 187 to direct current potential source 184. The secondary winding of transformer 187 has one end thereof connected to a source of bias potential 188 and the other end thereof connected through the parallel combination of capacitance 189 and resistance 190 to the base electrode 191 of transistor 192. The base electrode 191 of transistor 192 also is connected through diode 193 and resistance 194 to the parallel combination of resistance 195, diode 196 in series with resistance 197, and the primary winding of transformer 198 to ground. Emitter electrode 199 of transistor 192 is connected to ground. Collector electrode 200 of transistor 192 is connected through resistance 201, the secondary winding of transformer 198, and the primary winding of transformer 155 to the write winding 7 of the column cores of memory array 1.

Thus in accordance with an aspect of the invention, the input-output circuit of Fig. 5 comprises a readout loop threading the cores of a column of the magnetic core matrix, a pulse amplifier comprising transistors 158 and 166 for amplifying the information read out of the matrix, a magnetic core logic network comprising cores 171 and 178 for reinserting or changing information on the matrix, switching means 181 for selectively writing a one or zero into the array, and a transistor blocking oscillator comprising transistor 192 for driving the cores of the array during the write interval $\Phi_2$.

The core logic circuits receive an input pulse from the pulse amplifier if a one was stored in the core being sensed during the read interval $\Phi_1$ to set core 171. Subsequently, during the $\Phi_2$ interval, an impulse is applied from the pulse generator to reset core 171. Due to the resultant change of flux in core 171 a voltage is induced to cause current to flow to the blocking oscillator driver and a one is rewritten into the core of the matrix. Conversely, if no impulses were received initially from the pulse amplifier due to the fact that the core being sensed was storing a zero, there would be no such change of flux and the magnetic condition of the matrix core would not be changed.

If, however, it was desired to write new information into a core of the array, an inhibit signal from the inhibit amplifier and distribution system would be applied during read interval $\Phi_1$ for setting core 178 and cancelling any input impulse to core 171. The next impulse applied during the $\Phi_2$ interval resets core 178 and causes a voltage to be induced. If switch 181 is in the one position, a current is applied to the transistor blocking oscillator driver to write a one in the matrix core. Conversely, if switch 181 is in the zero position, no signal is applied to the core. This operation now will be explained in greater detail. When a core in a column of the memory array switches from the set to the unset condition during the reading interval a positive voltage pulse is induced in the pickup lead. This pulse is stepped up many times by the transformer action of stepup transformer 156 and is amplified by the pulse amplifier comprising transistors 158 and 166. The output of the pulse amplifier from the collector electrode 168 of transistor 166 causes current flow in winding 172 sufficient to set magnetic core 171 from the N to the P condition. The $\Phi_2$ pulse applied during the write interval from output circuit 75 of pulse generator 9 shown in Fig. 2 resets magnetic core 171 and generates a voltage pulse to trigger the blocking oscillator comprising transistor 192. Collector electrode 200 of transistor 192 supplies the current required by the memory array to rewrite the information into the selected magnetic core. If during the reading operation the core in the memory array did not have a one stored therein, magnetic core 171 would not be set to the P condition and the blocking transistor oscillator would not be triggered.

If it is desired, new information may be written into the array. This is handled by the inhibit amplifier which inhibits magnetic core 171 by driving it to the N condition while at the same time driving magnetic core 178 to the P condition. The subsequent $\Phi_2$ pulse then switches magnetic core 178 back to the N condition. This results in a voltage being generated which is applied to trigger transistor 192 of the blocking oscillator if switch 181 is open. The operation of the blocking oscillator causes a one to be written into the magnetic core memory array. If switch 181 is not open, the blocking oscillator is not triggered and a zero will be stored in the memory array.

Stating the operation of the system in another way, a pulse from the memory array is furnished to the pulse amplifier during the $\Phi_1$ time interval if the memory core being sensed were storing a one therein. Alternatively, no pulse will be applied to the pulse amplifier if during the $\Phi_1$ time interval the core being read was storing a zero.

Transformer 156 steps up the output of the memory core to an amount sufficient to drive the first transistor 158 to saturation. However, to allow for variation in transistors and provide more operating margin, a second amplifier stage comprising transformer 163 and transistor 166 advantageously is employed. This circuit delivers a pulse of proper polarity, duration, and amplitude to the magnetic core logic circuit when driven by an output pulse from the memory core. The output of the pulse amplifier may be applied to external utilization circuits by means of conductor 169 if desired. This output also is applied to a magnetic core circuit capable of providing logical AND and inhibit operations comprising magnetic cores 171 and 178. If at the $\Phi_1$ time interval a signal is available from the pulse amplifier, indicating the presence of a one in the memory core array, core 171 is set to state P by the flow of current from collector 168 through winding 172. At the subsequent $\Phi_2$ time interval, a signal from pulse generator 9 resets core 171 to state N by means of current through winding 175 of core 171 and winding 179 of core 178. Due to the change of flux in core 171, a voltage is induced across winding 176 which serves to back bias diode 182 so that the current from pulse generator 9 is caused to flow only through the path comprising winding 179 of core 178, winding 175 of core 171, diode 186 and the primary of transformer 187 to potential source 184. If during the $\Phi_2$ time interval no signal is available on winding 172 of core 171, there is no change of flux, no voltage is induced across winding 176 and the driver amplifier will not receive a signal. This logical operation of the magnetic core circuit is of the shunt output type described in F. T. Andrews, Jr. application Serial No. 425,875, filed April 27, 1954 now Patent 2,776,380, issued January 1, 1957.

Figure 6:
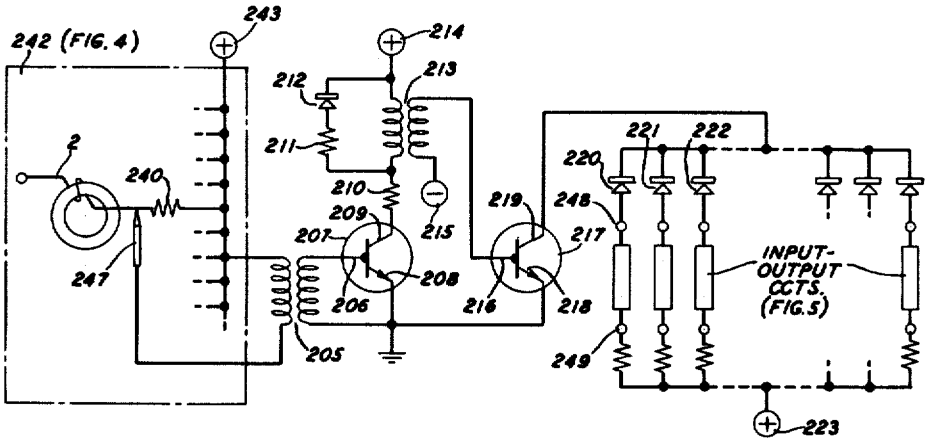
Fig. 6 is a schematic representation of an inhibit amplifier and distribution system adapted for use in the memory system of Fig. 1.

If an inhibit signal is present at the $\Phi_1$ time interval due to the operation of the inhibit amplifier and distributing circuit shown in Fig. 6 magnetic core 178 is set to state P and any $\Phi_1$ signal from the pulse amplifier to winding 172 is cancelled. If at the time the next $\Phi_2$ pulse is applied to winding 179 to reset core 178 to state N switch 181 is in the open or one position, the induced voltage across winding 183 will back bias diode 182 and thus will permit a signal, namely the current from generator output circuit 75, to flow through diode 186 to the blocking oscillator driver amplifier. If, however, as explained above, switch 181 is in the closed or zero position, no signal will be permitted to go to the driver circuit, as in the closed position of switch 181, the current from pulse generator 9, will flow through diode 180 to potential source 184.

In accordance with another aspect of the invention, transformer or core 155 is provided in the pickup loop of the memory array to offset the induced voltages introduced by the plurality of cores in a vertical column of the memory acting as single turn transformers energized by the blocking oscillator driver write pulse. The noise pulse from any signal core is insignificant, but the noise pulses from all of the cores of a column may be sufficient to produce an undesired signal. In order to eliminate this undesired signal, the turns of transformer 155 are adjusted to produce an equal and opposite pulse in series with the pickup transformer 156, thereby cancelling out such undesired signals. As noted above the transformer 155 advantageously includes a core of a square loop magnetic material and preferably of the same material as the memory cores of the column with which it is associated. The input and output windings on the core 155, which windings are connected in the write and output wires 7 and 8, respectively, are chosen so that the drive on the core 155 and thus the rate of change of flux in the core 155 is the same as for the memory cores. Also the flux excursion of the core 155 should have the same effect on the output wire 8 as the total flux excursions of the memory cores of that column. To state this another way the total flux linkages of the memory cores of the column should equal those of the core 155 on the output wire 8.

Fig. 6 shows an inhibit amplifier and distribution system which advantageously may be used to provide the inhibit signals for the input-output circuits of Fig. 5. The distribution system comprises a transistor amplifier circuit temporarily connected, as by a movable probe, to the appropriate address in the memory array so that a read current pulse is amplified sufficiently to distribute $\Phi_1$ inhibit pulses to the input-output circuits associated with each column of the array whenever the inhibit operation of the magnetic core logic is desired. To reduce the current requirements of the drive transistor of the distribution system input-output circuits advantageously are driven in a parallel arrangement, as depicted in Fig. 6 of the drawing, or in a combination series parallel arrangement. To prevent interaction between the various input-output circuits a plurality of diodes are used.

This is shown in detail in Fig. 6 which discloses a selected core in the memory array 242 being connected by a movable probe 247 held at resistor 240 through transformer 205 to the base electrode 206 of transistor 207. The emitter electrode 208 is connected to ground. The collector electrode 209 is connected through a resistance 210 to an output circuit comprising a resistance 211 and diode 212 connected in parallel with a primary winding of transformer 213, the output circuit being connected to a source of direct current potential 214. The secondary winding of transformer 213 has one end connected to a source of bias potential 215 and the other end thereof connected to the base electrode 216 of transistor 217. The emitter electrode 218 of transistor 217 is connected to ground. The collector electrode 219 is connected to the above-described series parallel arrangement wherein each of a number of diodes 220, 221, 222, et cetera, are connected through a pair of input-output circuits to a source of direct current potential 223. Thus as the read current pulse is received from the memory array each of the input-output circuits of the memory system receives a current pulse for proper operation of the magnetic core logic circuit in the manner described above.

It is to be understood that the above-described arrangements are illustrative of the principles of the invention and that numerous modifications may be made therein without departing from the spirit and scope of the invention.

What is claimed is:

1. A magnetic memory system comprising an array of magnetic elements arrayed in rows and columns, said magnetic elements being capable of assuming a first and a second stable magnetic state, program control means for simultaneously writing or reading information in a plurality of said elements in a single row, said program control means comprising a magnetic core master sequential switch and at least one magnetic core subroutine sequential switch, a pulse generator for selectively driving said master and subroutine switches, and input-output means coupled to said magnetic elements for energizing selected columns of the array in accordance with the information to be written therein, said input-output means comprising magnetic core logic means for selectively inhibiting information read out of the array from being rewritten and for enabling new information to be written therein.

2. A magnetic memory system comprising an array of magnetic elements arrayed in rows and columns, each of said magnetic elements having a substantially rectangular hysteresis characteristic, a source of alternating pulses of a first and second phase, a first switching means having a plurality of output conductor pairs connected to said source and operated thereby to provide a sequence of two phase pulses on said pairs, means for connecting selected ones of said pairs to selected rows of said magnetic elements whereby said two phase pulses are applied to said rows in a predetermined order and input-output means coupled to said columns of the array, said input-output means comprising means for receiving information read out of the array in response to a pulse of said first phase being applied to all of the magnetic elements of a selected row and means for rewriting said information into the array in response to a pulse of said second phase being applied to all of the magnetic elements of a selected row and the magnetic elements of selected columns of the array.

3. A magnetic memory system in accordance with claim 2 further comprising a second switching means having a plurality of output conductor pairs connected to said source and operated thereby to provide a sequence of two phase pulses on its output conductor pairs.

4. A magnetic memory system in accordance with claim 3 further comprising means for selectively applying said alternating pulses to either said first or said second switching means.

5. A magnetic memory system in accordance with claim 2 wherein said input-output means further comprises magnetic logic means for selectively inhibiting the information read from the array and for enabling new information to be written thereinto.

6. A magnetic memory system in accordance with claim 2 wherein said input-output means further comprises a first and second magnetic element for each column of said array, each element being capable of attaining two stable states, means connecting one said first magnetic element to its associated column whereby information read from said array when said pulses of said one phase is applied thereto switches said first magnetic element from a first to a second state, means for resetting said first magnetic element and rewriting said information into the array, and means for switching said second magnetic element from a first to a second state and thereby inhibiting said information from being rewritten into said array.

7. A magnetic memory system in accordance with claim 2 wherein said source of alternating pulses comprises a logic circuit including a plurality of pairs of magnetic elements and a plurality of transistors driving circuits connected thereto for determining whether said pairs are operated in or out of synchronism.

8. A magnetic memory system comprising an array of magnetic elements arranged in rows and columns, each of said elements having two stable states of remanent magnetization, magnetic logic control means for reading and writing a word in a selected row of said array, said control means comprising a first magnetic element also having two stable states of remanent magnetization connected to a column of the array, means for setting said first magnetic element when an information signal is read from said column, means for resetting said first magnetic element to produce an output pulse, means for applying said output pulses to said column of the array for rewriting said information signal into said array, a second magnetic element also having two stable states of remanent magnetization connected to said first magnetic element and means for setting said second magnetic element when an inhibit signal is applied thereto thereby to prevent said first magnetic element from causing an information signal to be rewritten into said array.

9. A magnetic memory system in accordance with claim 8 further comprising switching means connected to said first magnetic element and said second magnetic element of said magnetic logic control means, said switching means having an open and a closed position whereby an information signal is written into said array when said second magnetic element is reset and said switch is in the open position and no information signal is written into the array when said second magnetic element is reset and said switch is in the closed position.

10. A magnetic memory system in accordance with claim 9 further comprising a driver amplifier including a transistor blocking oscillator connected between said magnetic logic control means and said array for writing an information signal into said array upon receipt of an output pulse from said control means.

11. A magnetic memory system comprising a plurality of magnetic cores arrayed in rows and columns, each of said cores having a substantially rectangular hysteresis characteristic, a closed output loop threading each core in said columns, a write wire also threading each core in said columns, means for reading information out of said cores, means electrically coupled to said read-out loop for deteecting information read from any of said cores in said column, means for applying store pulses to said write wire to store information in any core in said column and means for preventing erroneous detection of said store pulse by said detecting means, said last-mentioned means comprising an error core also having a substantially rectangular hysteresis characteristic, said error core having a winding connected to said write wire and another winding connected in said closed loop for said column.

12. A magnetic memory system comprising a plurality of magnetic cores arrayed in rows and columns, each of said cores having a substantially rectangular hysteresis characteristic, a read-out wire threading each core in said rows, an impedance connected to each of said read-out wires, an output wire and a write wire threading each core in said columns, means including other magnetic cores also having a substantially rectangular hysteresis characteristic connected between said output and write wires of each column for regenerating information stored in said cores, and means for selectively inhibiting said regenerating means, said last-mentioned means including a probe temporarily connectable across said impedance and means for applying a pulse from said probe to said other magnetic cores.

13. A magnetic memory system comprising an array of magnetic cores arrayed in columns and rows, each of said magnetic cores being capable of assuming stable remanence conditions, a pair of magnetic core switching circuits, means for connecting said switching circuits to certain of said rows, a magnetic core pulse generator for applying pulses to either of said switching circuits, and magnetic core means for determinng to which of said switching circuits said pulses are applied.

14. A magnetic memory system in accordance with claim 13 further comprising magnetic core means for reading information out of a core in a column of said array and regenerating said information in said core.

15. A magnetic memory system comprising an array of magnetic cores, each of said cores being capable of assuming stable remanence conditions, a pair of magnetic core switching circuits, means for connecting said switching circuits to certain of said cores, a pulse generator for applying pulses to either of said switching circuits, and magnetic core means for determining to which of said circuits said pulses are applied.

16. A magnetic memory system in accordance with claim 15 wherein said last-mentioned means comprises a magnetic core having at least an input winding and an output winding, means applying a bias to said core, means applying pulses from said switching circuits to said input winding, and means connecting said output winding to said pulse generator.

17. A memory system comprising an array of magnetic elements each capable of attaining a first and a second stable state, said magnetic elements being connected in a plurality of rows and columns in said array, a source of pulses of a first and second phase, a first plurality of windings, each coupled to the magnetic elements of a row, a second plurality of windings each coupled to the magnetic elements of a column, means for writing a word into the magnetic elements of a selected row by applying a pulse of said second phase from said source to a winding coupled to said selected row and to certain ones of the windings associated with the columns whereby each magnetic element having a pulse on both its row winding and its column winding is switched from the unset to the set state, means for reading a word out of a selected row of the array by applying a pulse of said first phase to another winding coupled to the magentic elements of the selected row, and a word generator connected to said array, said word generator comprising a plurality of magnetic elements each also capable of attaining a first and a second stable state arranged in rows and columns, switching means connected to each of said magnetic elements of said word generator wherein an element is rendered ineffective when its associated switching means is operated, and means for applying pulses from said sources to the magnetic elements of said word generator so that a word may be written into a row of said word generator by operating certain ones of said switches in accordance with said word and applying a pulse of said second phase thereto and a word may be read from said word generator by applying a pulse of said first phase thereto.

18. A magnetic core circuit comprising a plurality of magnetic cores, each of said cores having a substantially rectangular hysteresis characteristic, a writing wire threading each of said cores, an output wire threading each of said cores, means electrically coupled to said output wire for detecting signal pulses thereon, means for applying store pulses to said writing wire to store information in at least one of said cores, and means for preventing said detecting means operating in response to said store pulses, said last-mentioned means comprising another magnetic core of the same material as said plurality of magnetic cores, said other magnetic core having an input winding connected to said writing wire and an output winding connected to said output wire, said input and output windings being adjusted so that the rate of change of flux is the same as of said plurality of magnetic cores and the total flux linkage of said output wire is the same.

(References on following page)

References Cited in the file of this patent

UNITED STATES PATENTS

| | | |
|---|---|---|
| 2,591,406 | Carter et al. | Apr. 1, 1952 |
| 2,691,155 | Rosenberg et al. | Oct. 5, 1954 |
| 2,691,157 | Stuart-Williams | Oct. 5, 1954 |
| 2,719,961 | Karnaugh | Oct. 4, 1955 |
| 2,719,965 | Person | Oct. 4, 1955 |
| 2,733,861 | Rajchman | Feb. 7, 1956 |
| 2,734,184 | Rajchman | Feb. 7, 1956 |
| 2,734,187 | Rajchman | Feb. 7, 1956 |
| 2,768,367 | Rajchman | Oct. 23, 1956 |
| 2,776,419 | Rajchman | Jan. 1, 1957 |
| 2,809,367 | Stuart-Williams | Oct. 8, 1957 |